(12) United States Patent
Kreuzer et al.

(10) Patent No.: US 8,099,858 B2
(45) Date of Patent: Jan. 24, 2012

(54) WINDING DEVICE FOR ELECTRIC MOTOR

(75) Inventors: Helmut Kreuzer, Schwieberdingen (DE); Eberhard Rau, Korntal-Muenchingen (DE); Dirk Wolf, Renningen (DE); Alexander Puhahn, Neuhausen (DE); Olaf Simon, Clayton (AU); Yvonne Goebel, Hockenheim (DE); Bernard Walle, Hemmingen (DE); Thomas Harrer, Weissach-Flacht (DE)

(73) Assignee: Robert Bosch GmbH, Stuttgart (DE)

( * ) Notice: Subject to any disclaimer, the term of this patent is extended or adjusted under 35 U.S.C. 154(b) by 370 days.

(21) Appl. No.: 11/719,423

(22) PCT Filed: Nov. 23, 2005

(86) PCT No.: PCT/EP2005/056163
§ 371 (c)(1),
(2), (4) Date: May 16, 2007

(87) PCT Pub. No.: WO2006/061323
PCT Pub. Date: Jun. 15, 2006

(65) Prior Publication Data
US 2009/0145995 A1 Jun. 11, 2009

(30) Foreign Application Priority Data
Dec. 8, 2004 (DE) .......................... 10 2004 059 087

(51) Int. Cl.
*B23P 19/00* (2006.01)
(52) U.S. Cl. ................ 29/732; 29/596; 29/736; 29/738; 140/92.1; 242/433

(58) Field of Classification Search ............ 29/596–598, 29/732–735, 564.1–564.6; 72/137–138; 242/432.5–432.6, 447.1; 140/92.1–92.2; 310/198, 234, 148
See application file for complete search history.

(56) References Cited

U.S. PATENT DOCUMENTS

| | | | |
|---|---|---|---|
| 3,793,694 A * | 2/1974 | Norkaitis | 29/732 |
| 3,810,587 A | 5/1974 | Muskulus | |
| 3,895,423 A * | 7/1975 | Arakelov et al. | 29/650 |
| 3,913,373 A * | 10/1975 | Kindig | 72/353.4 |
| 5,134,769 A * | 8/1992 | Scherer | 29/596 |
| 5,197,180 A | 3/1993 | Mihalko et al. | |
| 5,218,752 A * | 6/1993 | Hensel et al. | 29/736 |
| 5,294,855 A | 3/1994 | Mihalko | |
| 5,481,792 A * | 1/1996 | Baird | 29/605 |
| 5,619,085 A | 4/1997 | Shramo et al. | |
| 5,715,590 A * | 2/1998 | Fougere et al. | 29/564.1 |
| 5,860,615 A * | 1/1999 | Burch | 242/432.5 |
| 6,223,784 B1 * | 5/2001 | Kirschner | 140/92.2 |

(Continued)

FOREIGN PATENT DOCUMENTS
DE    1 488 661    5/1969
(Continued)

*Primary Examiner* — Minh Trinh
(74) *Attorney, Agent, or Firm* — Michael J. Striker

(57) ABSTRACT

A winding device for producing a field coil including a double-layer multiple-circuit winding for an electric motor includes a drive. The drive is configured to operate upon a winding mandrel with multiple lamellas arranged to be swung radially outwardly and inwardly by the drive in order to produce the double-layer multiple-circuit winding as a plurality of winding stacks that are arranged in separate slots and electrically connected in series, in parallel or both. At least two axially-separated winding stacks can be produced at the same time by the drive.

12 Claims, 8 Drawing Sheets

U.S. PATENT DOCUMENTS

| | | |
|---|---|---|
| 6,601,286 B1 * | 8/2003 | Sadiku .................... 29/596 |
| 2004/0207282 A1 | 10/2004 | Ueda et al. |
| 2004/0216302 A1 | 11/2004 | Kreuzer et al. |
| 2007/0180682 A1 | 8/2007 | Ueda et al. |

FOREIGN PATENT DOCUMENTS

| | | |
|---|---|---|
| DE | 2 138 452 | 2/1972 |
| DE | 33 24 493 | 1/1984 |
| DE | 102 08 566 | 9/2003 |
| GB | 1 353 538 | 5/1974 |
| GB | 2 123 617 | 2/1984 |
| JP | 50-101806 | 8/1975 |
| JP | 56-12845 | 2/1981 |
| JP | 2002-34210 | 1/2002 |
| JP | 2002034212 | 1/2002 |
| JP | 2004-320886 | 11/2004 |
| WO | 93/06649 | 4/1993 |

* cited by examiner

WINDING DEVICE FOR ELECTRIC MOTOR

SUMMARY OF THE INVENTION

The present invention is based on a winding device for a field coil, processing equipment, and an electric.

In the production of three-phase machines such as motors or generators, the problem arises that, in order to attain uniform coil positioning and, therefore, maximum efficiency, the three phase coils of the stator winding must be inserted individually and in succession in the slots of the stator iron core such that they overlap in the manner of roof shingles. The known method, i.e., wind a phase angle for each pole, distribute its conductive wire in a continual manner, form a wire crossover with the second conductive wire and wind its phase coil, then repeat the entire procedure for the third phase coil, is not economical for series production. Plug-in windings, in the case of which individual conductor loops are connected after they are inserted into slots, are not an option when larger numbers of conductors and/or poles are involved, because too many connection points for electrical contacts result. Winding techniques in which winding is carried out separately and the individual phases designed as winding stacks are subsequently joined have disadvantages—due to the non-uniformity of the winding and the nearly unavoidable conductor crossovers—that affect the output, efficiency, and service life of the machine.

SUMMARY OF THE INVENTION

The present invention is based on a winding device for producing a field coil for an electric machine, particularly a field coil, with a double-layer multiple-circuit winding, in the case of which the field coil is formed by a plurality of winding stacks that are connected in series and/or in parallel.

According to the present invention, a winding mandrel is provided, on which at least two axially separated winding stacks can be produced simultaneously.

The present invention makes it possible to simultaneously—quasi-continually, in particular—produce a three-phase field coil using a continuous method, thereby making it economical to use in series production. Any number of poles and conductors is possible, and the distribution of conductors in individual winding stacks can be symmetrical or asymmetrical. It is therefore possible to produce a wide variety of different field coils, e.g., for an entire family of motors or generators.

In a favorable embodiment, the winding mandrel includes laminations that can be swung radially outwardly, and one winding stack can be fit in a slot between two laminations. With the laminations swung outward, the winding stack being wound currently is fixed in position axially on the winding mandrel. When the laminations are swung back into place, the winding stacks can be displaced axially along the longitudinal axis of the winding mandrel.

In a favorable embodiment, a wire feed unit is provided such that wires fed to the winding mandrel can be swiveled around at least two axes. The wire feed unit is preferably displaceable perpendicularly to the longitudinal axis of the winding mandrel. The wire feed can therefore be angled, displaced and transposed such that winding stacks or groups of winding stacks can be wound in different directions of rotation. Initially, a winding stack or a group of winding stacks can be wound in a first direction of rotation, then a winding stack or a group of winding stacks can be wound in the opposite direction of rotation. The two, opposing directions of rotation in which the winding stacks are wound result in a north pole and a south pole, respectively, when current is applied to the field coil.

In a favorable embodiment, the wire feed unit is movable perpendicularly to a longitudinal axis of the winding mandrel. The wire feed unit and winding mandrel are located in a fixed axial arrangement. Advantageously, fully wound winding stacks are moved out of this region, to create space for new winding stacks, while the wire feed unit and winding mandrel remain in their positions. The design and operation of the winding device are simplified, and fewer mechanically moved parts are required.

In a favorable embodiment, a fixing device for fixing the wires in position is movably located on the winding mandrel. To start winding a new winding stack, a particular wire can be reliably retained on the winding mandrel until it comes back to rest where it started, thereby securing itself against slipping. It is therefore possible to wind the wire reliably and securely.

In a favorable embodiment, the wound winding stacks are axially displaceable in order to wind further winding stacks. The winding stacks can be wound simultaneously in groups and removed from the winding area in order to create space for the next group of winding stacks. In this manner, any number of winding stacks or groups of winding stacks can be produced in a quasi-continual manner. Favorably, an advancing device for gripping and axially displacing the winding stacks is provided. It is advantageous that the winding stacks remain in their positions relative to each other and in the formation in which they are produced. The winding stacks can be produced at precisely defined spacial intervals and in dimensions as will be subsequently required in the field coil.

In a favorable embodiment, a guide device that is radially distanced from the winding mandrel is provided in order to fix the wires in position when the winding stacks are displaced axially. Advantageously, a retaining device is provided to secure the wires leading to the winding stacks when they are displaced axially, preferably in the form of bars that are oriented perpendicularly to the wires. The wires can therefore be fixed in an exactly defined position on one side of the winding mandrel, and/or they can be redirected, and the wire feed device can be moved from one side of the winding mandrel to the other side, in order to create a defined winding start for a winding stack or a group of winding stacks that is wound in the opposite direction. It is particularly favorable that the guide device can be operatively connected with the wire feed such that the wires can trade places. When wires are guided in parallel, in particular, at least two outer wires can trade places, while an inner wire remains in its position. A phase reversal of the wires can thereby be attained in an automated manner by changing the withdrawal plane by 180° using the wire feed, which can move along two axes. A position of the winding stacks with the correct phase can therefore be attained, since the three-phase coils are produced with alternating left and right directions of rotation.

A resultant loop of the wires from one group of winding stacks to the next can be inserted by a bending device into a slot between the laminations, thereby enabling winding to be carried out on top of the loops when the next group of winding stacks is wound. A loop bending device of this type is advantageously provided on each side of the winding mandrel. The quasi-endless loop formation with phase reversal makes it possible to produce any number of groups in an automated manner, with simultaneous production of winding stacks.

In a favorable embodiment, the guide device and the advancing device are located on the same feed carriage. The fact that one feed carriage is used ensures that the bending and transposition of the winding wires can be carried out in exactly defined dimensions relative to the winding mandrel and the axial displacement.

In a favorable embodiment, the length of the winding mandrel corresponds to a complete field coil and a single leading winding and a single lagging winding for each pole. In the stretched state, the single winding can be guided out of the field coil and used as a lead. Between the two single windings, the winding stacks of a first field coil can be separated from winding stacks of the next field coil. The field coil preferably includes three phase coils—with two poles each—located in individual winding stacks. The field coil can be used in a three-phase machine.

With inventive processing equipment with an inventive winding device, a transposition tool is provided, into which the winding stacks can be inserted in the order required per the winding mandrel. The distances between the winding stacks and their spacial arrangement are retained. The winding stacks can be tilted in a defined manner such that they overlap in the manner of roof shingles. In this configuration, the field coil can be joined, e.g., in corresponding slots of a flat laminated core, which is then bent in a round shape to form a hollow cylindrical stator.

The winding and transposition of the field coil can be applied in series production, and they make it possible to produce large quantities of identical field coils without an excessive amount of manual intervention.

With an inventive electrical machine, a field coil is provided that is produced using an inventive winding device described above.

DESCRIPTION OF THE DRAWING FIGURES

Further embodiments, aspects and advantages of the present invention also result independently of their wording in the claims, without limitation to generality, from exemplary embodiments of the present invention presented below with reference to the drawing.

FIGS. 4 a-e show the steps that winding wires go through when a north pole is wound (a), and upon crossover to a winding of a south pole, with transposed placement (b), when bent and transposed by 180° (c), when bent and transposed by 45° (d), and at the beginning of the process to wind the south pole (e).

DETAILED DESCRIPTION OF THE INVENTION

Detailed Description of the Exemplary Embodiment

Figure 1:
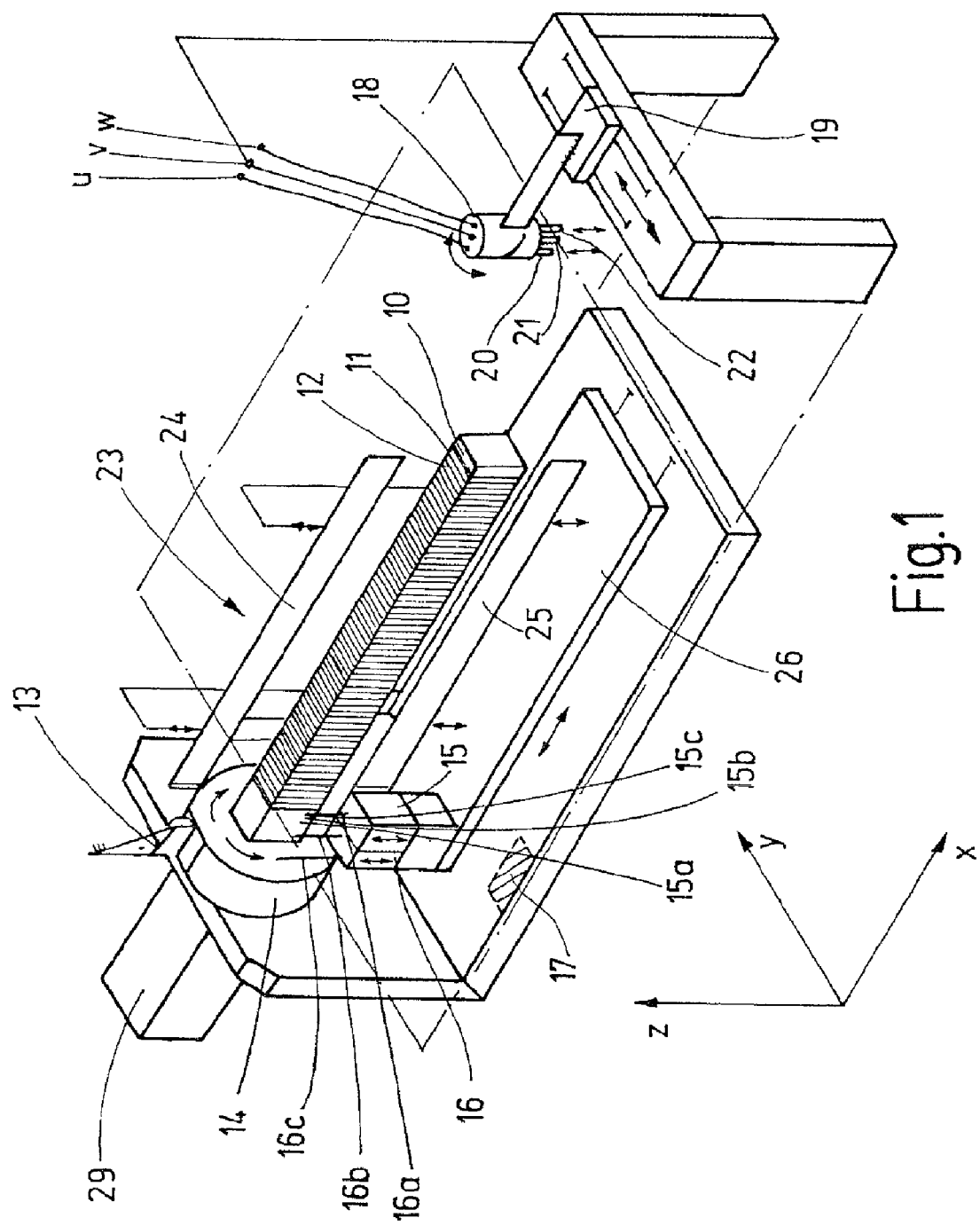
FIG. 1 shows a view of a preferred winding device in an exploded-type depiction.
Figure 2:
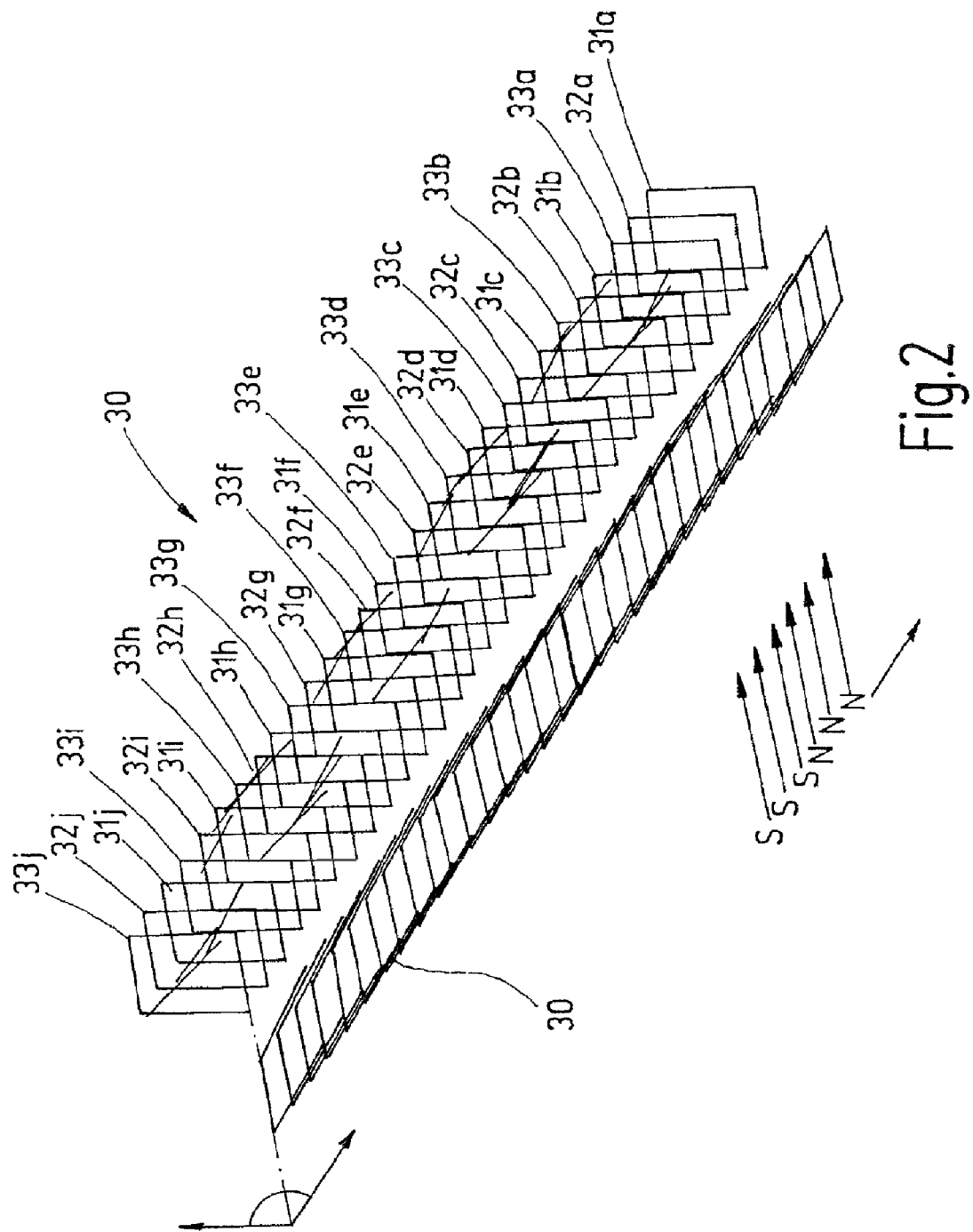
FIG. 2 shows a field coil before and after winding stacks are transposed.

FIG. 1 is an exploded-type depiction of a preferred winding device for producing a field coil 30 for an electrical machine. FIG. 2 shows field coil 30 with enumerated winding stacks 31a, 32a, 33a through 31j, 32j, 33j, which can be produced simultaneously. Windings stacks 31a . . . 31j result in a first phase coil 31, winding stacks 32a . . . 32j result in a second phase coil 32, and winding stacks 33a . . . 33j result in a third phase coil 33. FIGS. 4a-4e depict the wire guiding steps described below.

A winding mandrel 10 with a longitudinal axis x has a rectangular cross section that defines the dimensions of the winding stacks of field coil 30 to be produced. It is possible to produce at least two axially separated winding stacks 31a, 32a, 33a on winding mandrel 10 simultaneously. Winding mandrel 10 is provided with swingable, compartment-shaped laminations 11 on its edges, which can be actuated from the inside using not-shown shafts. Via their separating shape, laminations 11 convert the otherwise smooth surface of winding mandrel 10 into an annular slot stack with slots 12 between laminations 11. For simplicity, only a few of these elements are labeled with reference numerals in the figure and serve as examples. In slots 12 formed in this manner, wires u, v, w of the phase coil wires are wound simultaneously, thereby forming a first group of three winding stacks 31a, 32a, 33a in each slot 12.

This procedure is carried out in the clockwise direction, e.g., to wind a north pole N, then a south pole S is wound in the opposite direction. To accomplish this, winding mandrel 10 is rotatable from one side around its longitudinal axis x using a suitable servo drive, which is not described in greater detail. Servo drive 29 makes it possible to provide any number of windings in the group of simultaneously wound winding stacks 31a, 32a, 33a. It is also possible to produce an asymmetrical number of conductors, by using a different number of windings and by rotating in one direction and then in the other direction.

Wires u, v, w are fed to winding mandrel 10 through nozzles 20, 21, 22 using a wire feed unit 18 designed as a triple wire nozzle. A shaded region 17 indicates the actual position of wire feed unit 18, which, for simplicity, is shown some distance away from winding mandrel 10 and its actual position. Wire feed unit 18 and winding mandrel 10 are located in a fixed axial arrangement. In its actual position, wire feed unit 18 is located above the winding mandrel in the vicinity of a clamping device 13 that includes two triple wire clamps.

To wind in the clockwise direction, wire feed unit 18 is moved with a carriage 19 perpendicularly to longitudinal axis x of winding mandrel 10 into a position that is, e.g., to the left (in the figure) of winding mandrel 10, and it is moved to the right-hand side in order to wind in the opposite direction. It is thereby ensured that, when the winding direction is switched, fed wires u, v, w are under tension. After the three winding stacks 31a, 32a, 33a are wound, e.g., in the clockwise direction, the three winding stacks 31b, 32b, 33b are wound in the counterclockwise direction.

Clamping device 13 is movably mounted on winding mandrel 10; it includes two triple wire clamps (only one is shown), which are offset by 180°. To start a three-fold parallel winding of three winding stacks 31a, 32a, 33a, first triple wire clamp 27 securely holds wires u, v, w up to an angle of rotation of 180°, then it hands off to the second, not-shown triple wire clamp and releases wires u, v, w. The first winding is completed using the adjacent, second triple wire clamp. Wires u, v, w are then also released from the second triple wire clamp, and the desired number of further windings can be wound using the stiction of the first winding.

Figure 4A:
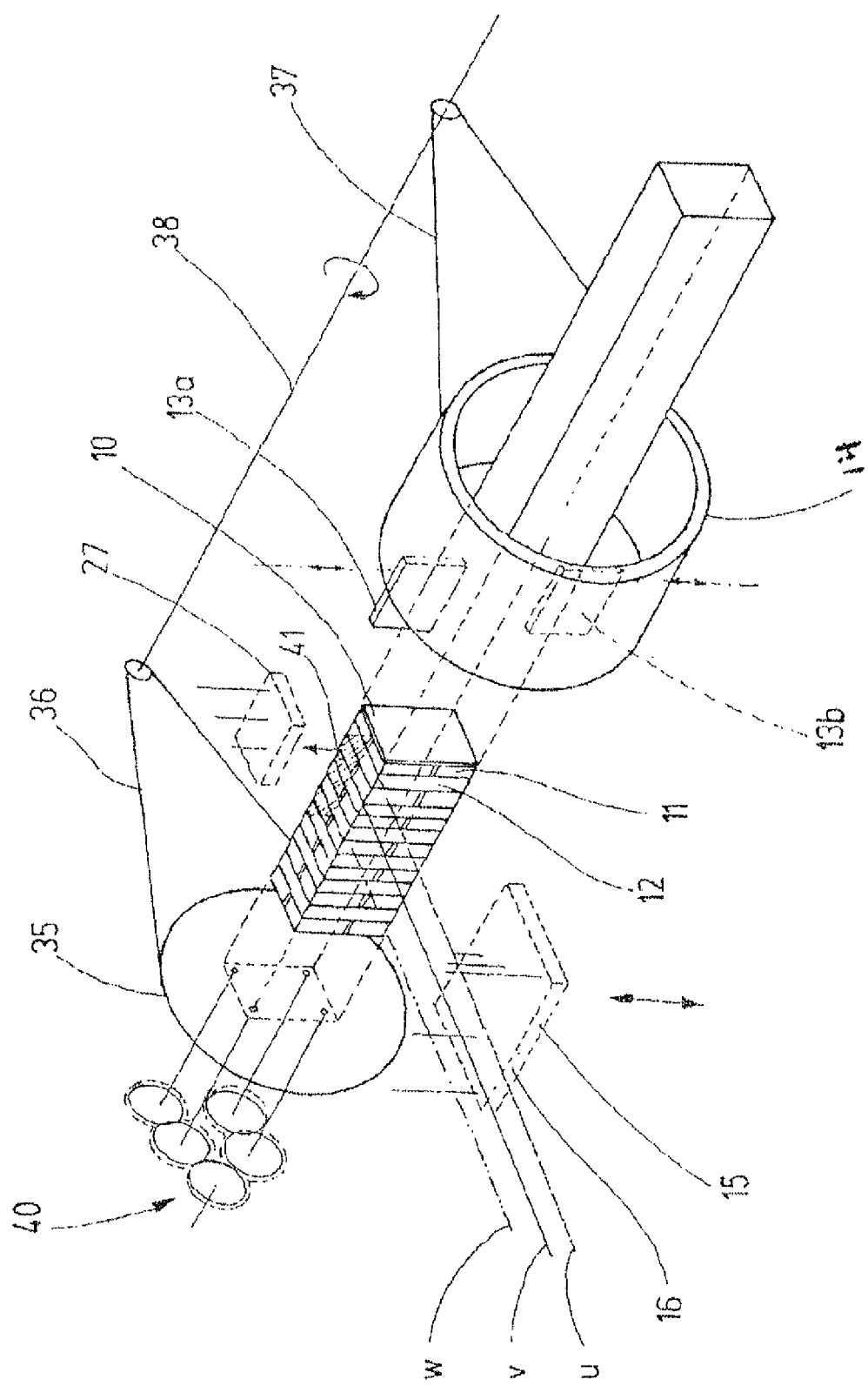

When three simultaneous winding stacks 31a, 32a, 33a, i.e., a three-phase pole coil, are completed, the rotation of winding mandrel 10 is halted and, depending on the current position of wire feed unit 18, i.e., to the left or right of winding mandrel 10, a guide device 15 designed as a guide block is raised from a lowered position (FIG. 4a). A similar guide device 15 is located on both sides of winding mandrel 10. As a result, retaining devices and/or shaped blocks 15a, 15b, 15c—which are offset in a stepped manner and are designed as guide pins—are positioned behind the three wires u, v, w.

Wire feed unit 18 is rotatable and swivels the plane formed by the three adjacent wires u, v, w by −45° around the z axis.

Figure 4B:
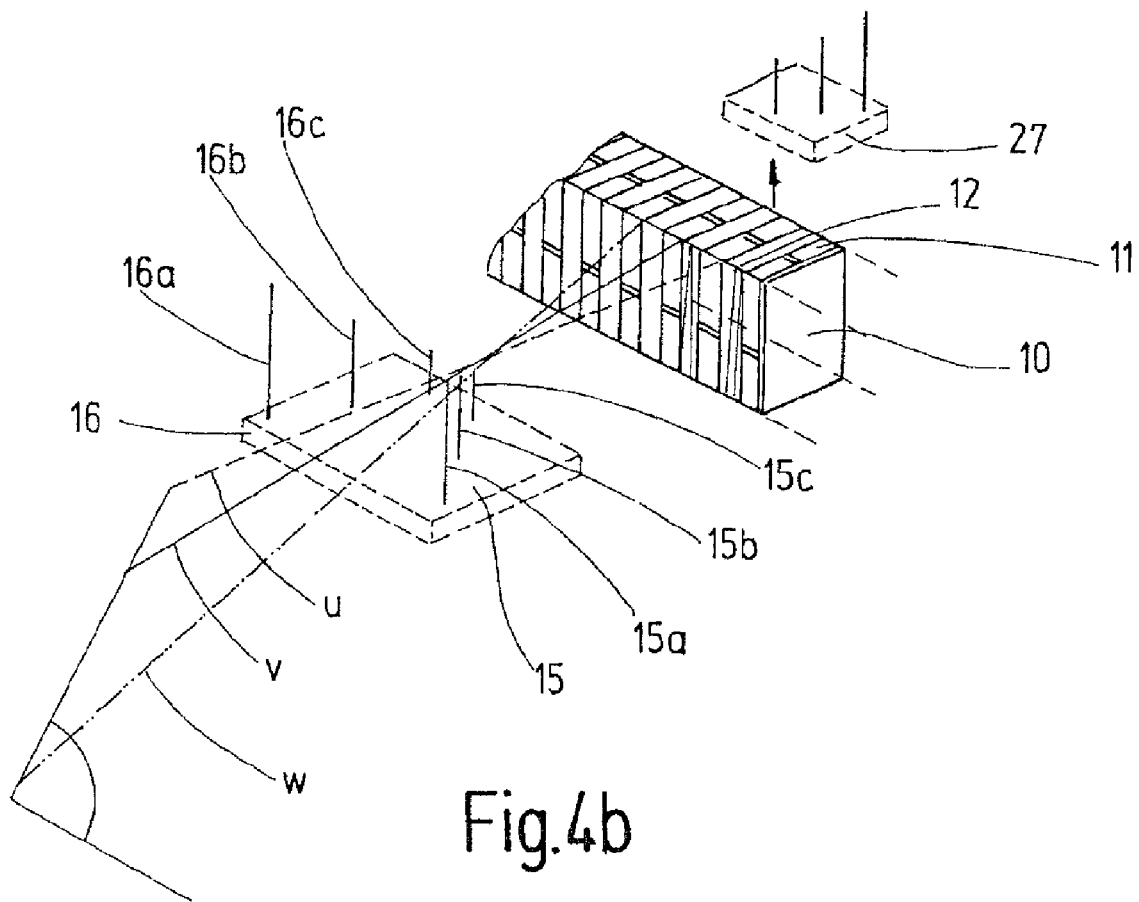

Simultaneously, nozzles 20, 21, 22 are swiveled by −45° around the y axis. Wires u, v, w now stretch across a plane that lies on the spacial diagonal (FIG. 4b). Retaining devices 15a, 15b, 15c are located in corresponding positions. Each of the retaining devices 15a, 15b, 15c therefore retains the wire assigned to it, i.e., wire U, v or w.

An advancing device 23 is now moved toward winding mandrel 10. Advancing device 23 includes, e.g., an upper feed comb 24 and a lower feed comb 25 offset by 180° relative thereto. Feed combs 24, 25 serve to maintain the orientation of winding stacks 31a, 32a, 33a that have already been wound. When feed combs 24, 25 have assumed the same orientation as the coils, laminations 11 are swung back into winding mandrel 10. Winding mandrel 10 then has a smooth surface. A feed carriage 26 can now be moved; it carries first guide device 15 and a second guide device 16—for which there is also a corresponding, not-shown guide device on the other side of winding mandrel 10. In the meantime, winding mandrel 10 and wire feed unit 18 remain in their positions.

Figure 4C:
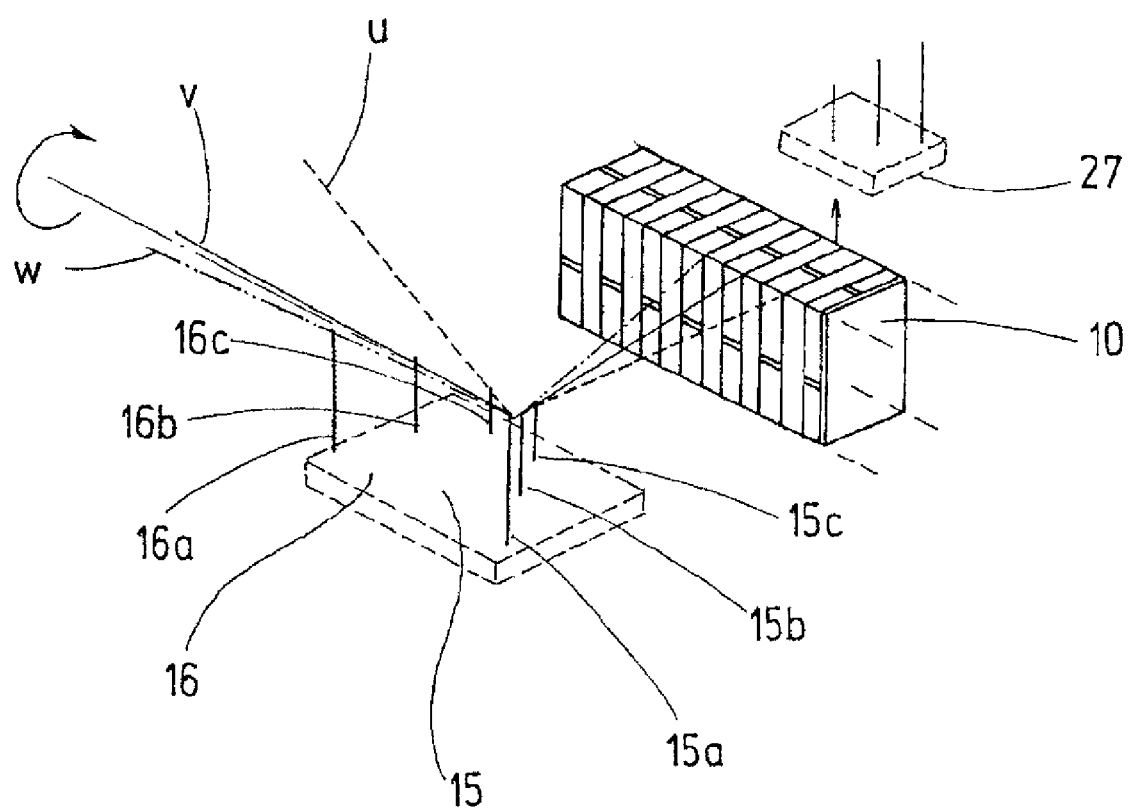

The shift forward extends for the width of three winding stacks 31a, 32a, 33a, i.e., three pole coils and their intermediate spaces created by laminations 11. Wires u, v, w are redirected into the x direction by guide device 15 (FIG. 4c).

Figure 4D:
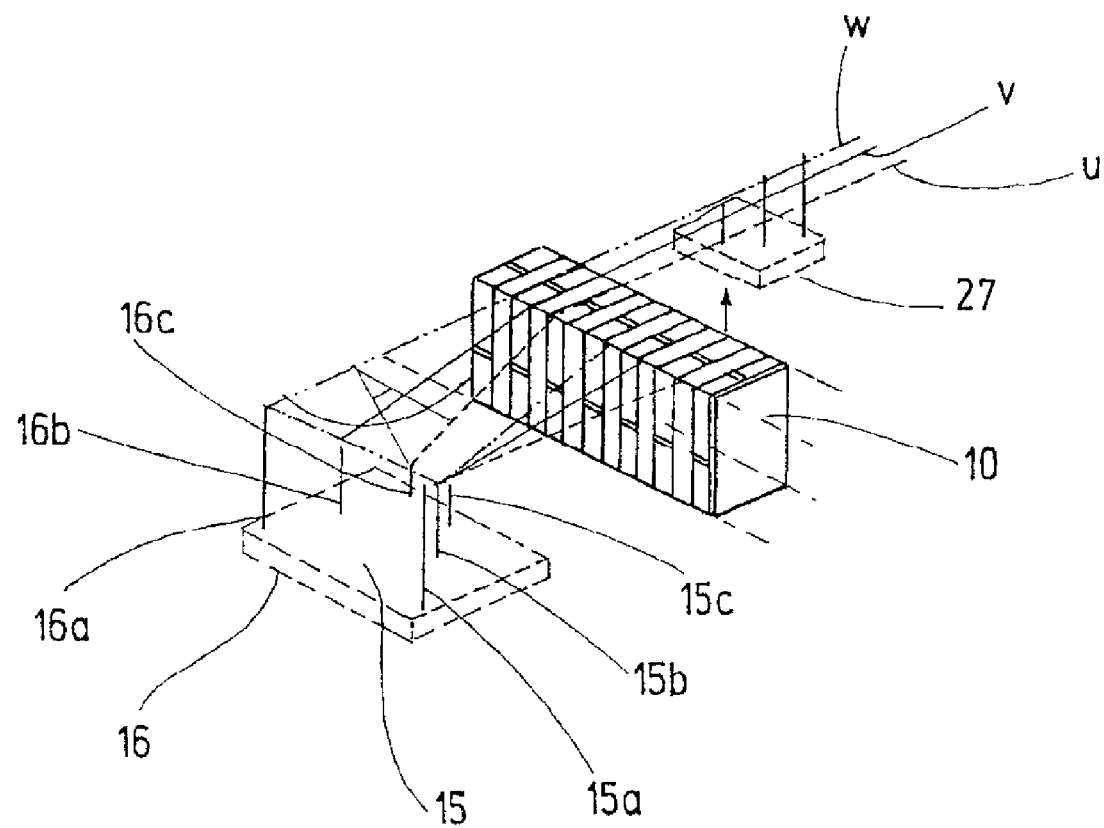

After the forward motion, laminations 11 are swung out of winding mandrel 10, and advancing device 23 is retracted. Field coil 30 is now shifted to the right in the x direction on winding mandrel 11, along the distance equal to a pole coil "triplet" composed of winding stacks 31a, 32a, 33a. Guide devices 15, 16, which are also mounted on feed carriage 26, are moved in a synchronous manner with the forward motion. While the forward motion is being carried out, wire feed unit 18 changes its orientation around the z axis from −45° to +45°, and around the y axis, also from −45° to +45°. In conjunction with the forward motion in the x direction, therefore, wires u, v, w change positions, i.e., wire u located at the front in the x direction while the north pole coil is being wound remains in this position when the south pole coil is wound. This is accomplished by the fact that wire v of the middle phase remains in its position, and the two outer wires u, w trade positions by crossing over each other (FIG. 4c). At the end of the forward motion, second guide device 16 is raised—after wires u, v, w have passed its position in the pulling and forward-motion direction—then wires u, v, w change direction again, from the x direction to the y direction, by carriage 19 moving to the left (FIG. 4d).

While carriage 19 moves with wire feed unit 18 over winding mandrel 10, wire feed unit 18 and nozzles 20, 21, 22 are swiveled back to their neutral position, by +45° along the particular axis. Wires u, v, w, which extend flat across winding mandrel 10 in slots 12 formed via swung-out laminations 11, are fixed in position once more with upper triple wire clamp of fixing device 13. Both guide devices 15, 16 are subsequently lowered once more.

In summary, after the winding of one group of winding stacks 31a, 32a, 33a is completed, guide device 15 is raised, then the three wires u, v, w—which have been swiveled by 45° on the y axis—are moved past it. Finally, and simultaneously with the forward motion of winding stacks 31a, 32a, 33a—which have already been wound—the three wires u, v, w are pulled out of wire feed unit 18 in the x direction. A phase reversal of the withdrawal plane of wires u, v, w by 180° takes place, brought about by wire feed unit 18, which is movable along two axes. The middle wire v remains in its position, while wires u and v trade positions. After the forward motion and phase-reversal motion, guide device 16 is raised, and the same procedure as took place with guide device 15 is carried out in reverse sequence. This is the only way to attain an in-phase arrangement of winding stacks 31a, 32a, 33a, because the three-phase coils are created in the left and right winding direction in an alternating manner.

Figure 4E:
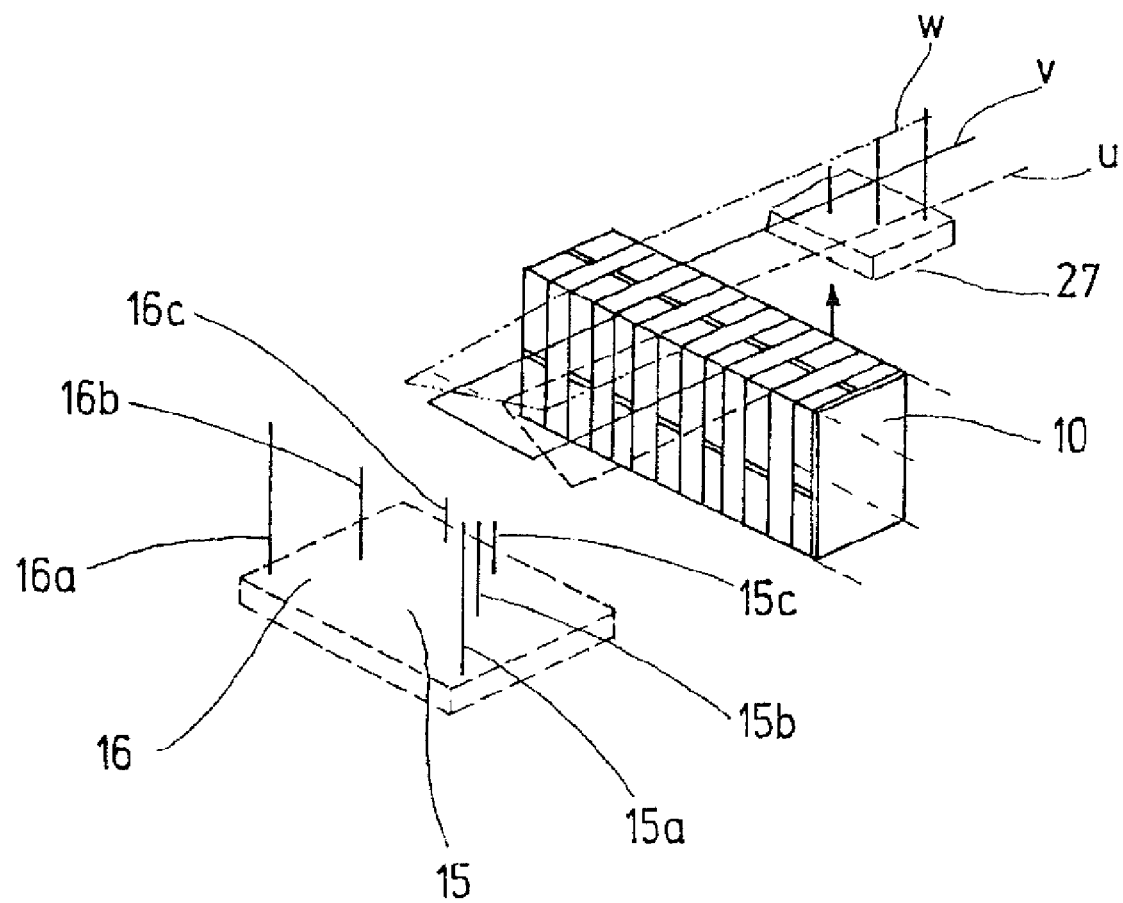

Using a not-shown bending tool, the three U-shaped loops 39 are distributed on winding mandrel 10—in the same axis of motion—from the first coil triplet to second coil triplet 31a, 32a, 33a, 31b, 32b, 33b, and the conductors are switched in the y direction. The shape of loops 39 and/or outwardly-swung laminations 11 and/or the bending tool make it possible to carry out this procedure. The position that is thereby attained corresponds exactly—apart from the wire feed side and the opposite winding direction now required—to the situation that existed when the winding of the first three winding stacks 31a, 32a, 33a was started (FIG. 4e). The winding and clamping of the coil, and all of the other details also remain the same, apart from the fact that the nozzles are swiveled in the opposite directions. The next winding stacks 31b, 32b, 33b are wound over loops 39, which are already in place.

If the aim is to create asymmetric numbers of conductors, all that has to be done is to adjust the number of windings differently forward/backward.

During the actual winding procedure, feed carriage 26 is returned to its starting position. In this manner, an endless field coil 30 is created quasi-continually.

Since the aim is to produce field coils 30 with a defined number of poles without having to redraw wires u, v, w after a field coil 30 has been completed, a three-fold single winding is wound before the first winding stack or the first group of winding stacks 31a, 32a, 33a, so that two single-fold windings situated one behind the other are located between two complete field coils 30. Winding mandrel 10 is designed such that there is enough space in slots 12 formed by laminations 11 and provided by feed combs 24, 25 for a complete field coil 30 and three single-fold windings. This means that, e.g., for each 16-pole, three-phase field coil 30 and the three single-fold windings mentioned, the number of slots that must be provided is N=57 slots (N=16×3+3×3).

When a field coil 30 is created with the leading and lagging single-fold windings, wire loops 39 for the next single-fold winding have been created, and wires u, v, w have been fixed in position once more on winding mandrel using fixing device 13, a not-shown transfer device—designed as a pair of transfer combs, e.g., similar to feed comb pair 24, 25 but lying parallel to the xy-plane—is moved into position. The wire bridges between the single-fold windings can now be cut using a not-shown cutting device. Laminations 11 are swung inwardly, and separated field coil 30 can be pulled off of the winding mandrel in the x direction. Laminations 11 are then swung outwardly once more, and the winding procedure can be continued.

Separated field coil 30 is inserted in a transposition tool, as indicated in FIG. 2, by guiding the upper and lower coil conductors into not-shown slots. The slots are closed using not-shown swivel seals, to ensure that the conductors remain in their positions. The transfer combs are then retracted.

The two leading and lagging single-fold windings are withdrawn from the coil core using a drawing device, and they form the subsequent connecting lines. The 16-pole, three-phase field coil 30 is now transposed into a skewed position, and the 48 individual coils now overlap each other in the manner of roof shingles (lower part of FIG. 2). A double-layer multiple-circuit winding is therefore formed, which can be joined, e.g., in slots of a flat laminated core. The laminated core can then be bent round into the shape of a hollow cylinder to form a stator of a preferred electrical three-phase machine.

Figure 3:
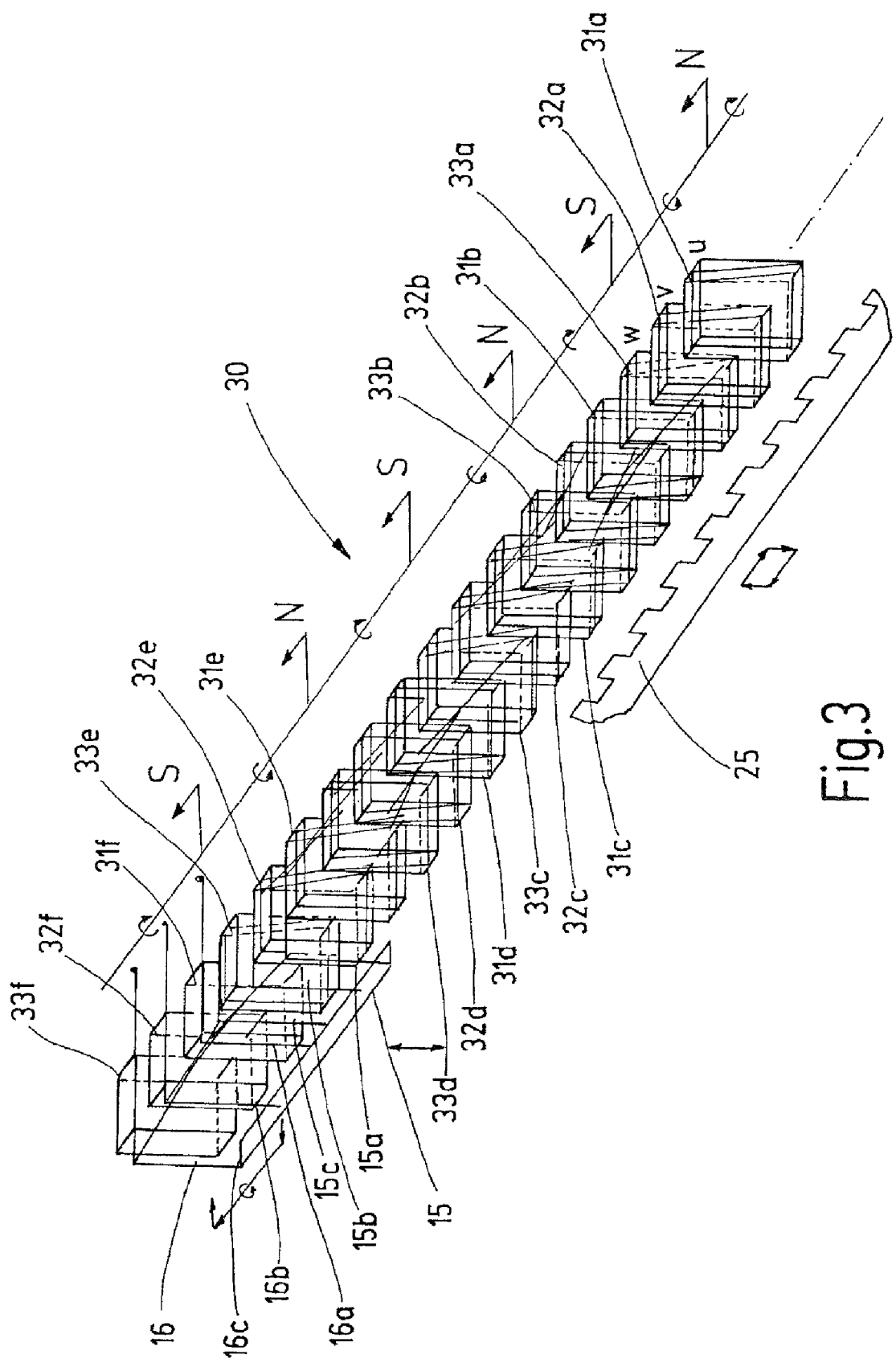
FIG. 3 shows winding stacks of a field coil with a displacement device.

FIG. 3 shows winding stacks 31a, 32a, 33a . . . 31e, 32e, 33e of a field coil 30 wound in opposing winding directions in an alternating manner. This results in the formation of alternating north poles N and south poles S in field coil 30. A section of a feed comb 25 is also shown; it is provided to displace winding stacks 31a, 32a, 33a . . . 31e, 32e, 33e. Its teeth that face winding stacks 31a, 32a, 33a . . . 31e, 32e, 33e line up with the gaps between winding stacks 31a, 32a, 33a . . . 31e, 32e, 33e. Toward the back of the figure, it is shown how wires u, v, w are already in place at the start of a procedure to wind winding stacks 31f, 32f, 33f. Small arrows indicate the direction of rotation in which the particular group of winding stacks 31a, 32a, 33a . . . 31e, 32e, 33e have been wound.

FIGS. 4a through 4e illustrate how the wires are guided when field coil 30 and carriage 19 of wire feed unit 18 are displaced, as described above in conjunction with the procedure described with reference to FIG. 1. FIGS. 4b through 4e only show the details of how the wires are guided. FIG. 4a also shows a drive 40 for swinging laminations 11 outwardly and inwardly. Drive 40 is driven using not-shown gears and shafts at each edge of winding mandrel 11. An output wheel 35 is non-rotatably connected with the winding mandrel and drives an axle 38 via driving means 36, e.g., a chain or belt. Numeral 27 labels an element of one of the guide devices on the other side of winding mandrel 10 that functions in a manner analogous to that of guide devices 15, 16. It is also connected in a driving manner via driving means 37 with a hollow cylinder 24 that rotates three-fold clamps 13a and 13b in a synchronous manner with winding mandrel 10. A shaded region 41 near laminations 11 and slots 12 (only a few of the large number of similar elements are shown) indicates the actual position of three-fold wire clamps 13a, 13b. Three-fold clamps 13a, 13b are located on the inner circumference of hollow cylinder 14 such that they are offset by 180°, and they extend axially beyond hollow cylinder 24 so far that hollow cylinder 14 does not collide with the wire feed.

What is claimed is:

1. A winding device for producing an electric motor field coil (30), which includes a double-layer multiple-circuit winding, said device comprising: a drive (40) configured to operate upon a winding mandrel (10) having multiple lamellas (11) arranged to be swung radially outwardly and inwardly by the drive (40) in order to produce the double-layer multiple-circuit winding as a plurality of winding stacks (31a, 32a, 33a . . . 31j, 32j, 33j) that are arranged in separate slots and electrically connected in one of series, in parallel and both, with at least two axially-separated winding stacks (31a, 32a, 33a) produced at the same time by the drive (40); and a wire feed unit (18) for feeding a number of wires (u, v, w) to the winding mandrel (10) in such a way that they are swung around at least two axes (y, z), wherein the wire feed unit (18) is displaceable perpendicularly to a longitudinal axis (x) of the winding mandrel (10).

2. The winding device as recited in claim 1, wherein the wire feed unit (18) and the winding mandrel (10) are located in a fixed axial arrangement.

3. The winding device as recited in claim 1, further comprising a fixing device (13) for fixing a number of wires (u, v, w) in position on the winding mandrel (10), wherein the fixing device is movably located on the winding mandrel (10).

4. The winding device as recited in claim 1, further comprising a guide device (15, 16) that is radially separated from the winding mandrel (10) and configured to fix a number of wires (u, v, w) in position when the winding stacks (31a, 32a, 33a) are displaced axially.

5. The winding device as recited in claim 1, wherein the length of the winding mandrel (10) corresponds to a complete field coil (30) and a single leading winding and a single lagging winding for each of North and South poles.

6. The winding device as recited in claim 1, further comprising feeding with a wire feed unit (18) wires (u, v, w) to the winding mandrel (10); and swinging the wires (u, v, w) around at least two axes (y, z).

7. The winding device as recited in claim 6, further comprising displacing the wire feed unit perpendicularly to a longitudinal axis (x) of the winding mandrel (10).

8. The winding device as recited in claim 6, further comprising locating the wire feed unit (18) and the winding mandrel (10) in a fixed axial arrangement.

9. A winding device for producing an electric motor a field coil (30), which includes a double-layer multiple-circuit winding, said device comprising, a drive (40) configured to operate upon a winding mandrel (10) having multiple lamellas (11) arranged to be swung radially outwardly and inwardly by the drive (40) in order to produce the double-layer multiple-circuit winding as a plurality of winding stacks (31a, 32a, 33a . . . 31j, 32j, 33j) that are arranged in separate slots and electrically connected in one of series, in parallel and both, with at least two axially-separated winding stacks (31a, 32a, 33a) produced at the same time by the drive (40), wherein the drive (40) axially displaces and swings the wound winding stacks (31a, 32a, 33a) inwardly in order to wind further winding stacks (31b, 32b, 33b); and an advancing device (23) for gripping and axially displacing the winding stacks (31a, 32a, 33a).

10. A winding device for producing an electric motor field coil (30), which includes double-layer multiple-circuit winding, said device comprising: a drive (40) configured to operate upon a winding mandrel (10) having multiple lamellas (11) arranged to be swung radially outwardly and inwardly by the drive (40) in order to produce the double-layer multiple-circuit winding as a plurality of winding stacks (31a, 32a, 33a . . . 31j, 32j, 33j) that are arranged in separate slots and electrically connected in one of series, in parallel and both, with at least two axially-separated winding stacks (31a, 32a, 33a) produced at the same time by the drive (40); a guide device (15, 16) that is radially separated from the winding mandrel (10) and configured to fix a number of wires (u, v, w) in position when the winding stacks (31a, 32a, 33a) are displaced axially; and a retaining device (15a-c, 16a-c) configured to secure the wires (u, v, w) leading to the winding stacks (31a, 32a, 33a) when they are axially displaced.

11. A winding device for producing an electric motor field coil (30), which includes double-layer multiple-circuit winding, said device comprising: a drive (40) configured to operate upon a winding mandrel (10) having multiple lamellas (11) arranged to be swung radially outwardly and inwardly by the drive (40) in order to produce the double-layer multiple-circuit winding as a plurality of winding stacks (31a, 32a, 33a . . . 31j, 32j, 33j) that are arranged in separate slots and electrically connected in one of series, in parallel and both, with at least two axially-separated winding stacks (31a, 32a, 33a) produced at the same time by the drive (40); a guide device (15, 16) that is radially separated from the winding mandrel (10) and configured to fix a number of wires (u, v, w) in position when the winding stacks (31a, 32a, 33a) are displaced axially; and a wire feed unit (18) for feeding wires (u, v, w) to the winding mandrel (10) in such a way that they are swung around at least two axes (y, z), wherein the guide device (15, 16) and the wire feed unit (18) are operatively connected such that, when wires (u, v, w) are guided in parallel, the guide device and wire feed unit together enable a position interchange of at least two outer wires (u, w) while maintaining an inner wire (v) in its position.

12. The winding device as recited in claim 11, wherein the guide device (15, 16) and the advancing device (23) are located on the same feed carriage (26).

* * * * *